Oct. 31, 1944.　　　　S. L. CASELLA　　　　2,361,453

STOP ROLL

Filed May 7, 1943　　　　2 Sheets-Sheet 1

INVENTOR
SECONDO L. CASELLA
BY
J. B. Felshin
ATTORNEY

Oct. 31, 1944.  S. L. CASELLA  2,361,453
STOP ROLL
Filed May 7, 1943  2 Sheets-Sheet 2
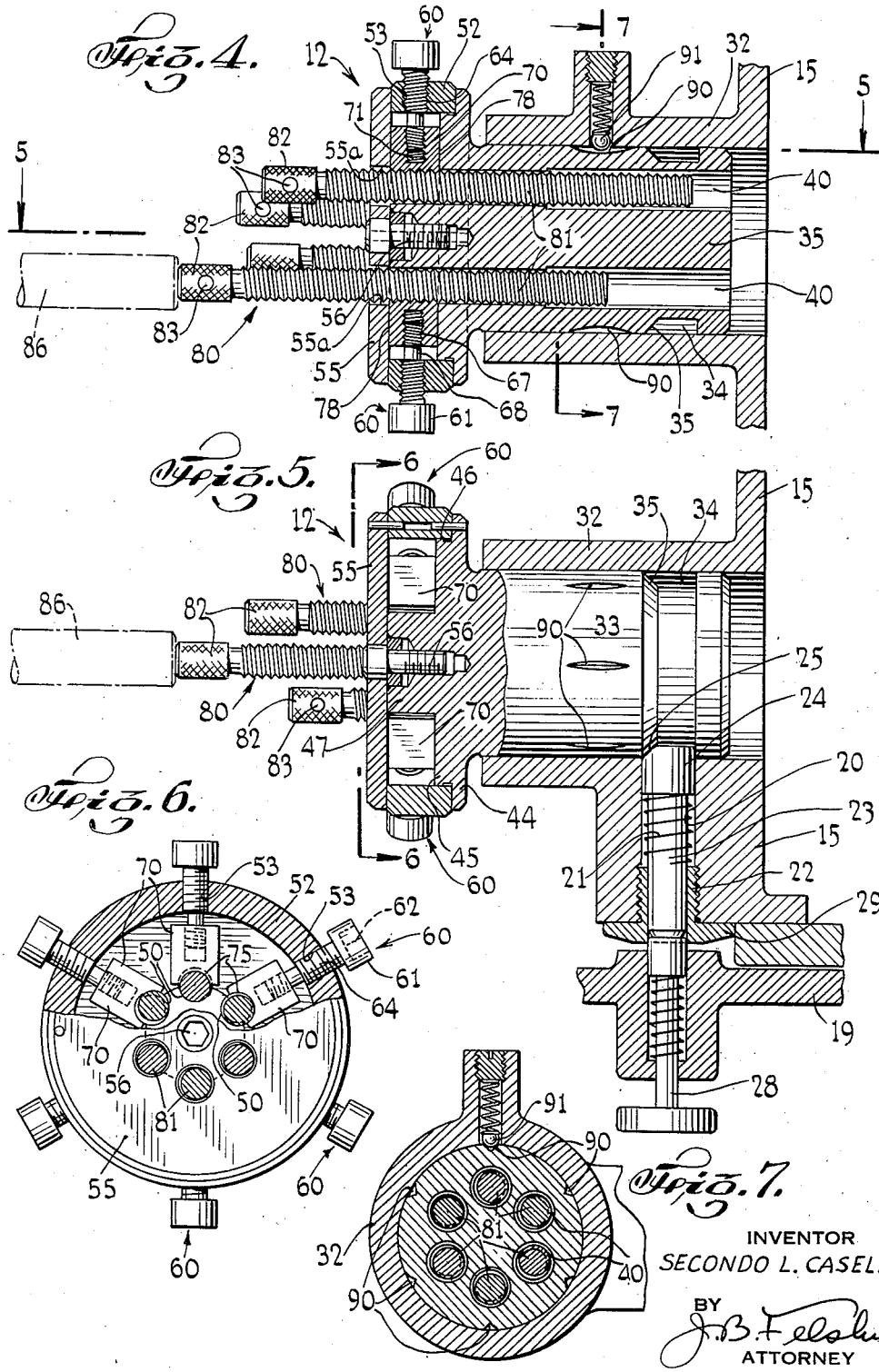
INVENTOR
SECONDO L. CASELLA
BY
ATTORNEY Patented Oct. 31, 1944

2,361,453

UNITED STATES PATENT OFFICE 2,361,453

STOP ROLL

Secondo L. Casella, Brooklyn, N. Y., assignor to Morey Machinery Co., Inc., New York, N. Y., a corporation Application May 7, 1943, Serial No. 485,967

8 Claims. (Cl. 82—21)

This invention relates to stop rolls. It is particularly directed to a stop roll for a cross slide or turret slide of a lathe, or the like devices.

In prior constructions the stop roll comprised a plurality of parallel screws which had to be screwed to adjust them longitudinally to proper positions. Since the adjustment may vary considerably for the different stop screws, and the screws are so close that it is difficult to turn them, much time and labor was necessary to make the proper adjustment.

It is therefore an object of the present invention to provide a highly improved stop roll of the character described having means for making quick and easy adjustments of the stop screws, thus saving considerable operator's time.

Still a further object of the present invention is to provide in a stop roll of the character described, a stop screw and a half nut engageable with the threads of the stop screw, and means to retract the half nut to permit sliding movement of the stop screw, the retracting means for the half nut comprising a member screwed to a fixed part of the stop roll and to the half nut by opposite threads respectively, whereby to facilitate retraction of the half nut.

A further object of the present invention is to provide a compact, rugged and durable stop roll of the character described, which shall be smooth and positive in operation, easy to adjust and assemble, and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a front elevational view of a cross slide provided with a stop roll embodying the invention;

Fig. 4 is a vertical, longitudinal cross-sectional view of the improved stop roll embodying the invention;

Fig. 5 is a cross-sectional view taken on line 5—5 of Fig. 4;

Fig. 6 is a cross-sectional view taken on line 6—6 of Fig. 5 and with parts broken away; and Fig. 7 is a cross-sectional view taken on line 7—7 of Fig. 4.

Figure 1:
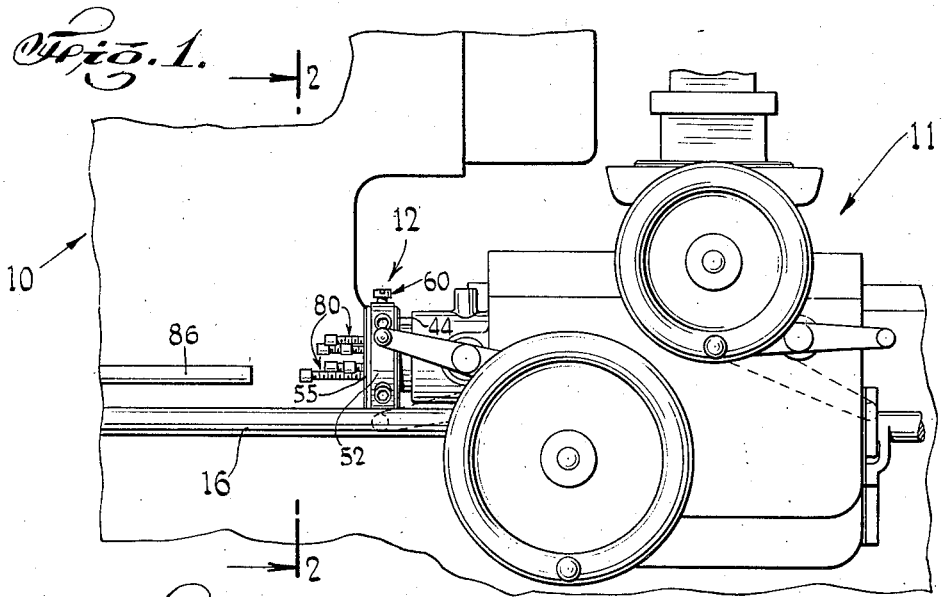
Figure 2:
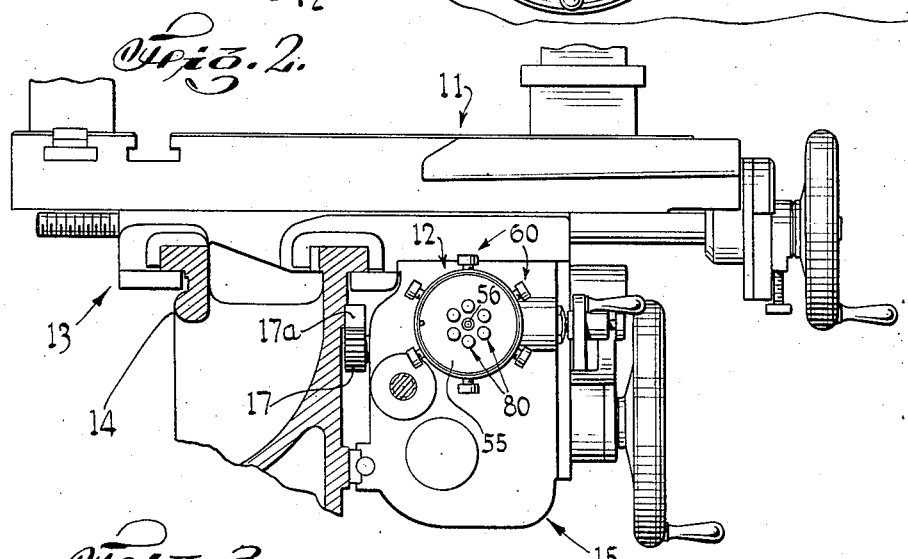
Fig. 2 is a cross-sectional view taken on line 2—2 of Fig. 1.
Figure 3:
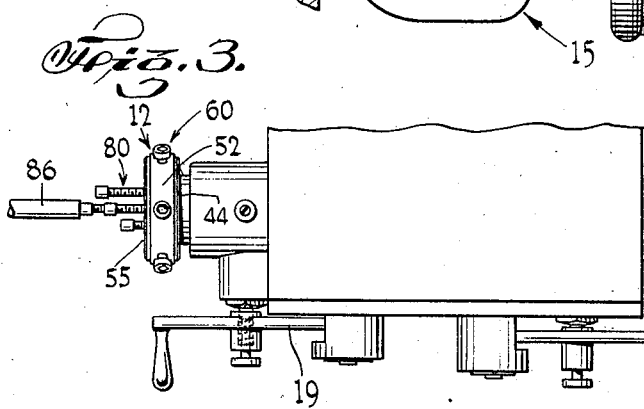
Fig. 3 is a top plan view of the structure shown in Fig. 1.

Referring now in detail to the drawings, 10 designates a bed portion of a lathe and 11 designates a cross slide mounted thereon and provided with a stop roll 12 embodying the invention. The cross slide 11 comprises a saddle 13 slidably mounted on the bed 14 of the lathe. Attached to the saddle 13 is a feed box 15 in which there is mounted suitable gearing receiving power from a shaft 16 adapted to drive a pinion 17 through a clutch (not shown) within the box. Pinion 17 meshes with a rock 17a fixed to the bed 14. The clutch may be controlled by a lever 19, the arrangement being such that when said lever is raised the clutch is actuated for connecting the shaft 16 to pinion 17 for moving the cross slide to the left looking at Fig. 1. When the lever is released and drops, the power drive is disconnected from the pinion.

The box 15 is provided with through opening 20 in which is fixed a sleeve 22. Slidably mounted in said sleeve is a spring pressed plunger rod 23 having a head 24 at one end formed with a beveled surface 25. Spring 21 serves to urge the plunger inwardly. On lever 19 is a spring pressed pin 28 adapted to snap into the outer end of sleeve 22 to keep the lever in raised position. The outer end of the sleeve is formed with a rounded knob 29 on which a pin 28 rides to snap into the sleeve. When the pin 28 engages within the sleeve, the lever is maintained in clutching position. However, when the plunger 23 is pushed outwardly in the sleeve, in the manner hereinafter appearing, the pin 28 is pushed out of the sleeve and the lever drops by gravity to disconnect the power drive for the cross slide.

The stop roll 12 comprises adjustable means to push out the plunger 23 when it is desired to stop the power drive for the cross slide. To this end box 15 is provided with a horizontal, cylindrical portion 32. Rotatably mounted within said cylinder is a member 33 formed with an annular groove 34 having a frusto-conical surface 35. The head 24 of the plunger 23 is adapted to project into the groove 34 and the beveled surface 25 thereof engages the tapered surface 35 of said groove 33. When member 33 is moved to the right, looking at Fig. 5 of the drawings, the plunger 24 is pushed out to disconnect the lever.

Said cylindrical member 33 is formed with a plurality of parallel longitudinal through openings 40 equiangularly spaced about the axis of said member and at equal distances radially from said axis. The member 33 is formed with an annular flange 44 having a boss 45 forming an annular shoulder 46. At the front end of member 33 is an annular reduced hub 47, the radius of which is equal to the radius of the circle for the holes 40. Thus the hub 47 is formed with semi-cylindrical grooves 50 comprising continuations of the openings 40.

Fitted onto shoulder 46 of member 33 is an annular cylindrical ring 52, the outer edge of which is flush with the hub 47. The ring 52 is formed with equiangularly spaced radial screw threaded openings 53. Each pair of opposite screw threaded openings 53 are in a plane passing through the axes of a pair of opposite holes 40. Fixed to the outer surface of hub 47 is a circular plate 55 contacting the outer edge of ring 52. Ring 52 may be doweled to plate 55 and flange 44. The plate 55 may be attached to the hub of member 33 by means of an axial screw 56. Said plate 55 is formed with through openings 55a registering with the openings 40 of member 33.

Screwed within each opening 53 is a screw threaded member 60. Each member 60 has a head 61 which may be formed with a hexagonal socket 62. Each of said members 60 comprises a screw threaded portion 64 engaging within threads of the threaded hole 53. At the outer end of each screw 60 is a screw threaded portion 67 having threads opposite to the threads of portion 64 and separated from portion 64 by a non-threaded reduced shank portion 68.

Between portion 45 of member 33 and plate 55 are half nuts 70, there being one for each screw 60. Each half nut 70 is formed with a screw threaded opening 71 receiving the threaded portion 67 of screw 60. Each half nut 70 is formed with a threaded semi-annular groove 75 for the purpose hereinafter appearing.

It will be noted that each half nut has flat side surfaces 78 contacting the inner surfaces of plate 55 and portion 45 of member 33, respectively. Thus, as each screw 60 is turned, the half nut will move in or out. The movement of the nut 70 is greater than the movement of the screw 60 by reason of the fact that said screw 60 has oppositely threaded portions engaging the ring 52 and the half nut 70.

Within each opening 40 is an elongated stop screw 80. Each screw 80 passes through one of the openings 55a and has an elongated screw threaded shank 81 and a head 82 which may be formed with a transverse through opening 83. The threads of shanks 81 are similar to the threads 75 of the half nuts. The half nuts may thus be moved into threaded engagement with the screw shanks 81. When a half nut engages a screw 80, said screw may be turned to obtain a fine adjustment. However, by turning the retracting screw 60, the half nut may be quickly disengaged from the stop screw and then said stop screw may be slidably moved longitudinally of the opening 40 for rough adjustment.

The lathe is provided with a stop rod 86 coaxial with one of the stop screws and is adapted to selectively engage one of the screws 80. Thus as the cross slide moves to the left by power, one of the screws 80 will contact the stop rod 86 and member 33 will be moved to the right to push back the plunger 23 and release the lever 19 to stop the power drive.

The stop roll may be rotated about its axis to selectively bring the various stop screws into alignment with the stop rod 86. Thus the different stop screws may be adjusted for the different operations of the turret lathe on each work piece, and the stop screws may be quickly adjusted in the manner described above.

Heretofore the stop screws had only threaded engagement with the stop roll and sometimes had to be turned a great number of times to bring them in to proper positions. This was especially difficult because by inserting a pin into opening 83 to turn the stop screw, such pin cannot be continuously rotated, and the stop screw can only be given a partial turn before the engaging pin must be withdrawn and reinserted.

This tedious adjustment of the stop screw is obviated because a simple turn of any screw 60 retracts the half nut and permits the stop screw to be quickly adjusted to the desired position. Thereafter the half nut is reengaged with the stop screw and then the stop screw may be turned slightly in either direction to obtain a fine adjustment.

It will be noted that the stop roll 33 is formed with a plurality of longitudinal, parallel, equiangularly spaced grooves 90 engageable by a spring pressed ball 91 to retain the stop roll in its various angular positions. There are as many grooves 90 as openings 40 in member 33.

Although the invention has been described in connection with a cross slide, it will be understood that the improved stop roll may also be utilized in the turret slide to stop movement of the turret slide after each operation.

It will be noted that when the half nuts are engaged with the stop screws they cannot be retracted without rotating the screw 60 thus preventing movement of the screws relative to member 33. Contact of the stop screw with the stop rod 86 will therefore not cause retraction of the half nut engaging said stop screw, but will cause the stop roll as a whole to move bodily to release the lever 19.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. In combination, a cylindrical sleeve, a stop roll slidably and rotatably mounted in said sleeve, spring pressed means to retain said stop roll from accidentally rotating within said sleeve, said stop roll being formed with a plurality of equiangularly spaced, longitudinal openings, equally spaced radially with respect to the axis of said stop roll, said stop roll being formed with an annular ring and with a central hub, a plate fixed to the front end of the hub and contacting said ring forming an annular chamber between said hub and ring, the diameter of said hub being substantially equal to the diameter of the circle for said longitudinal openings, whereby said hub is formed with half grooves forming continuations of said openings, said ring being formed with radial screw threaded openings aligned with said half grooves, screws having portions screwed within said screw threaded openings, and additional threaded portions, the threads of which are opposite to the threads of the first screw threaded portions, and half nuts screwed to each of the second screw threaded portions of said screws, said half nuts non-rotatable in said chamber, having threaded grooves, and stop screws within said longitudinal openings engaged by the threaded grooves of said half nuts.

2. A stop roll of the character described, comprising a member having a cylindrical portion and being formed with a plurality of equiangularly spaced longitudinal openings, equally spaced from a common axis, longitudinal screw threaded stop members in said openings, said member being formed with a plurality of radial screw threaded openings opposite said longitudinal openings, screws having portions screwed within said screw threaded openings, half nuts slidably mounted on said member and having threaded engagement with said stop members, said screws having portions screwed to said half nuts, the portions of each screw being oppositely threaded.

3. In combination, a cylindrical sleeve, a cylindrical member rotatably and slidably mounted in said sleeve, said cylindrical member being formed wtih external, longitudinal, equiangularly spaced grooves, spring pressed means selectively engageable with said grooves to retain said cylindrical member in selected angular positions, said cylindrical member being formed with longitudinal through openings, said through openings being equiangularly spaced and equidistant from the axis of said cylindrical member, half nuts radially movable on said cylindrical member, and having threaded engagement with said screws.

4. In combination, a sleeve, a cylindrical member rotatably mounted therein, said cylindrical member being formed with a plurality of longitudinal openings, equiangularly arranged about the axis of said cylindrical member, screw threaded stop members slidably mounted within said through openings, half nuts engaging said stop members, and means to retract said half nuts, said means comprising screws having oppositely threaded portions, one portion having threaded engagement with said cylindrical member, and the other portion having threaded engagement with said half nut.

5. A stop roll comprising a cylindrical member formed with equiangularly spaced through openings equidistant from the axis of said member, said cylindrical member being formed with an annular flange having an annular shoulder, and being furthermore formed with a central hub extending beyond said flange, the outer diameter of said hub being similar to the diameter of the circle for said openings, whereby said hub is formed with grooves forming extensions of said openings, a plate fixed to said hub and having openings registering with the through openings, an annular ring on said annular shoulder forming a chamber between said flange and plate, said ring being formed with screw threaded openings opposite said first mentioned openings, screws screwed into the threaded openings of said ring, and half nuts within said chamber, said screws having screw threaded portions screwed to said half nuts, the portions of the screws which are screwed to the half nuts being oppositely threaded relative to the portions of the screws which engage the screw threaded openings in said annular ring.

6. A stop roll comprising a cylindrical member formed with equiangularly spaced through openings equidistant from the axis of said member, said cylindrical member being formed with an annular flange having an annular shoulder, and being furthermore formed with a central hub extending beyond said flange, the outer diameter of said hub being similar to the diameter of the circle for said openings, whereby said hub is formed with grooves forming extensions of said openings, a plate fixed to said hub and having openings registering with the through openings, an annular ring on said annular shoulder forming a chamber between said flange and plate, said ring being formed with screw threaded openings opposite said first mentioned openings, screws screwed into the threaded openings of said ring, and half nuts within said chamber, said screws having screw threaded portions screwed to said half nuts, the portions of the screws which are screwed to the half nuts being oppositely threaded relative to the portions of the screws which engage the screw threaded openings in said annular ring, and screw threaded stop members passing through said openings in the annular plate and cylindrical member, and engageable by said half nuts.

7. A stop roll comprising a rotatable member, a stop screw slidable thereon, a half nut engaging the threads of said stop screw, means to retract said half nut, said means comprising a screw having a portion screwed to said rotatable member, and a portion screwed to said half nut, said portions being oppositely threaded.

8. In combination, a cylindrical sleeve, a stop roll slidably and rotatably mounted in said sleeve, said stop roll being formed with a plurality of equiangularly spaced, longitudinal openings, equally spaced radially with respect to the axis of said stop roll, said stop roll being formed with an annular ring and with a central hub, an annular chamber between said hub and ring, the diameter of said hub being substantially equal to the diameter of the circle for said longitudinal openings, whereby said hub is formed with half grooves forming continuations of said openings, said ring being formed with radial screw threaded openings aligned with said half grooves, screws having portions screwed within said screw threaded openings, and additional threaded portions, the threads of which are opposite to the threads of the first screw threaded portions, and half nuts screwed to each of the second screw threaded portions of said screws, said half nuts non-rotatable in said chamber, having threaded grooves, and stop screws within said longitudinal openings engaged by the threaded grooves of said half nuts.

SECONDO L. CASELLA.